E. S. WOODS & A. A. WEIGEL.
ANTIFRICTION BEARING.
APPLICATION FILED MAR. 27, 1911.
1,059,694.
Patented Apr. 22, 1913.
2 SHEETS—SHEET 1.
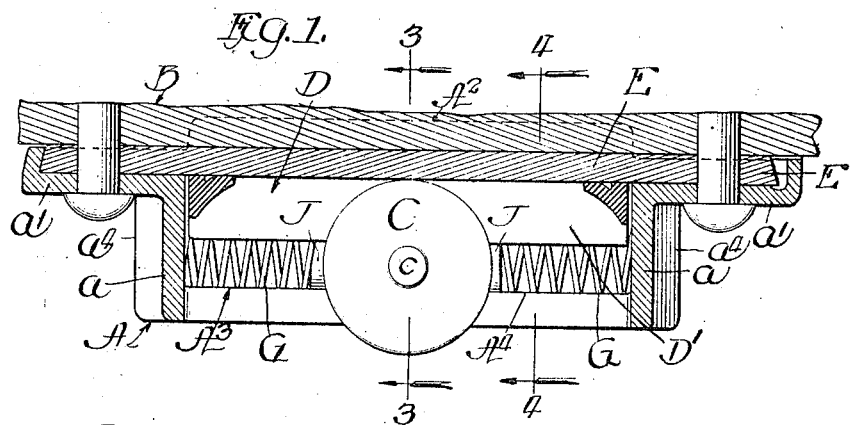
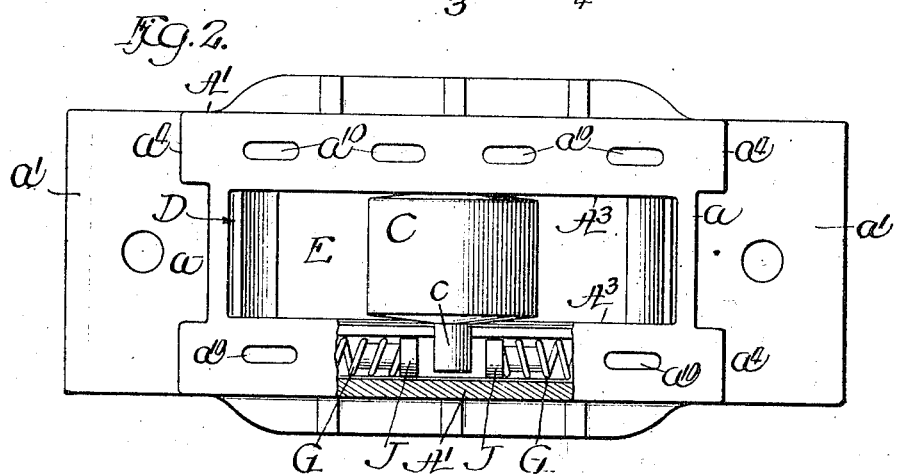
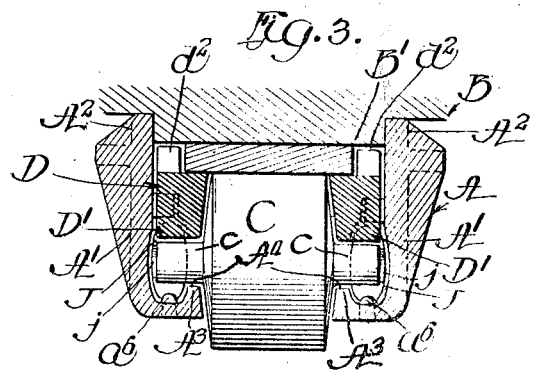
Witnesses:
Inventors:
Edwin S. Woods
Arnold A. Weigel
by Poole & Brown Attys E. S. WOODS & A. A. WEIGEL.
ANTIFRICTION BEARING.
APPLICATION FILED MAR. 27, 1911.
1,059,694.
Patented Apr. 22, 1913.
2 SHEETS—SHEET 2.
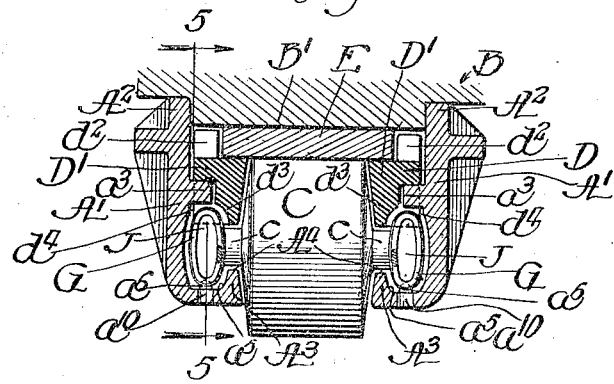
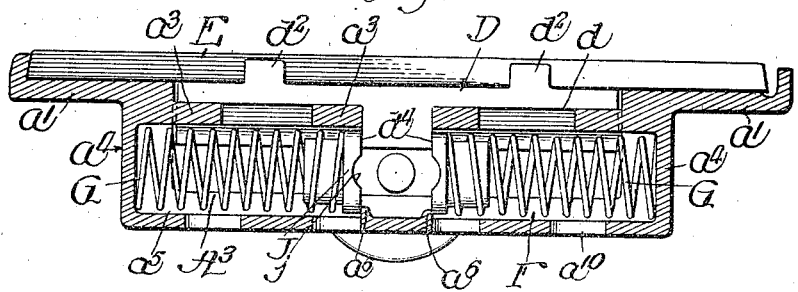
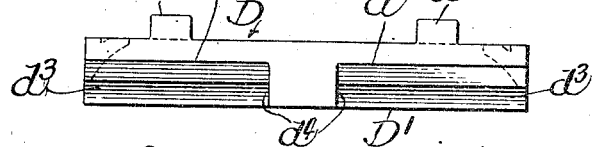
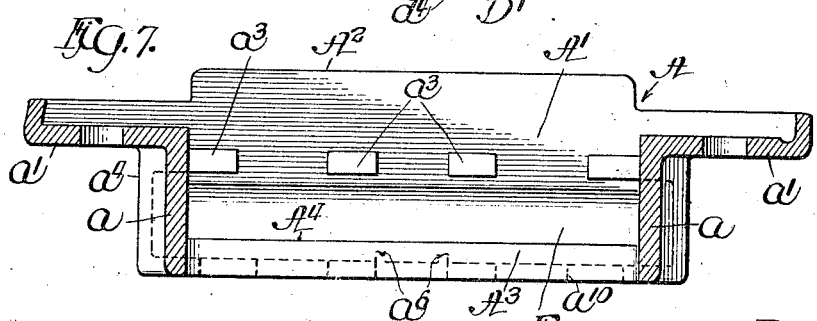
Witnesses:
T. H. Alfreds
H. R. Wilkins
Inventors:
Edwin S. Woods
Arnold A. Weigel
by Poole & Brown Attys

UNITED STATES PATENT OFFICE.

EDWIN S. WOODS AND ARNOLD A. WEIGEL, OF CHICAGO, ILLINOIS; SAID WEIGEL ASSIGNOR TO SAID WOODS.

ANTIFRICTION-BEARING.

1,059,694.  Specification of Letters Patent.  Patented Apr. 22, 1913.

Application filed March 27, 1911. Serial No. 617,224.

*To all whom it may concern:*

Be it known that we, EDWIN S. WOODS and ARNOLD A. WEIGEL, citizens of the United States, and residents of Chicago, in the county of Cook and State of Illinois, have invented certain new and useful Improvements in Antifriction-Bearings; and we do hereby declare that the following is a full, clear, and exact description thereof, reference being had to the accompanying drawings, and to the letters of reference marked thereon, which form a part of this specification.

This invention relates to improvements in anti-friction bearings for railroad cars and consists of certain novel features of construction hereinafter described and more particularly pointed out in the appended claims.

The bearing is of that class which comprises a suspension casing secured to the car body bolster and containing a suspended antifriction roller adapted when the bearing is transmitting load to engage between a bearing plate in the top of the casing and a bearing plate located on the truck bolster.

In the drawings—Figure 1 is a view representing a longitudinal, central section through the casing of a side bearing containing the novel features of our invention. Fig. 2 is a bottom plan view of the same; Fig. 3 is a view representing a transverse section through the bearing on a plane indicated by the line 3—3 of Fig. 1; Fig. 4 is a view representing a transverse section through the bearings on the line 4—4 of Fig. 1; Fig. 5 is a view representing a longitudinal section through the bearing on the line 5—5 of Fig. 4; Fig. 6 is a view representing a side elevation of a hollow rectangular frame located within the casing of the bearing and forming the upper members of the guide-ways in which the trunnions of the anti-friction roller travel. Fig. 7 is a view representing a longitudinal section of the suspension casing. Fig. 8 is a side elevation of one of the shoes which forms part of the means for centering the roller.

Referring now to that embodiment of our invention illustrated in the drawings, A represents a casing comprising the suspension member by means of which the antifriction device, in this case a roller C provided with end trunnions $c$, is suspended from a car bolster B. Said casing is in the form of a rectangular frame longer than it is wide, and having side walls $A'$, $A'$ and end walls $a$, $a$. At the tops of the end walls $a$, $a$ are provided horizontal flanges $a'$, $a'$, upon which rest the ends of a bearing or wear plate E, the top of which engages against the car bolster B, and the bottom face of which forms a tread for the antifriction roller C. As shown herein, the bolster is provided with a rib $B'$ which engages directly against the top surface of said wearing plate with its lateral edges embraced by upright extensions $A^2$, $A^2$, of the side walls $A'$ of the suspension casing.

At the lower edges of the side walls $A'$, $A'$, of the casing are provided inwardly-projecting flanges $A^3$, $A^3$, at the inner edges of which are formed longitudinal, parallel rails $A^4$, $A^4$ supporting the trunnions $c$, $c$ of the antifriction roller when said roller is not transmitting load. Said trunnions travel in paths or guideways, the lower limits of which are defined by said rails $A^4$, $A^4$, while the upper limits are defined by the lower edges of side members $D'$, $D'$ of a rectangular frame D which fits within the walls of the suspension casing A. The frame D is supported within the casing by lugs $a^3$ extending inwardly from the side walls $A'$ of said casing and engaging under horizontal, longitudinally-extending, laterally-disposed shoulders $d$, $d$, formed on the side members $D'$, $D'$ of the frame D. The inner edges of the rails $A^4$, $A^4$ and the inner edges of the side frame members $D'$, $D'$ are inclined in a direction parallel to the ends of a vertical section of the roller as indicated in Fig. 4, and act as guides for the ends of the roller. The wear-plate E, intermediate its ends, rests on top of the frame D and confines it within the casing A. As shown herein, said wear-plate is narrower than said frame D which has upright lugs $d^2$ $d^2$ adapted to engage the lateral edges of the wear-plate and hold it against lateral shifting.

The following means is provided for centering the roller C: In each side wall of the suspension casing A are formed longitudinal chambers F F (see Figs. 4 and 5) extending from points at either side of the middle of said side wall to each end thereof. As shown herein the end walls *a a* of the casing are provided with vertical hollow ribs $a^4$ $a^4$ by means of which said chambers F F are prolonged beyond said end walls, as shown in Fig. 7. Said chambers are greater in height than in width, the flanges $A^3$ bearing the rails and the side members D' of the frame D being provided with longitudinal grooves $a^5$ and $d^3$, respectively, to give the increased height. In said chambers are located coiled expansion springs G carrying at their inner ends shoes J which are adapted to engage the trunnions *c*, *c*, of the roller when it is rolled beyond its central position in the casing, said trunnions projecting beyond the rails and into said chambers so that their ends stand in line with said shoes. At either side of a transverse median line of the casing are located oppositely facing upper shoulders $d^4$ $d^4$ formed on the side members D' D' of the frame D and oppositely facing lower shoulders $a^6$ $a^6$ rising from the bottoms of the grooves $a^5$, each shoulder $a^6$ being located vertically below a shoulder $d^4$, and the several shoulders standing in the plane of action of the shoes J. The movement of the shoes J toward the center of the casing under the action of their controlling springs G, is limited by said shoulders against which they are held by their associated springs when the roller is in its middle position. By reason of this construction the roller is allowed a slight independent movement when in the center of the casing. Any movement beyond this position brings the trunnions of the rollers into engagement with the shoes J on that side of the middle of the casing toward which it is traveling, and the continued movement of the roller toward that end of the casing puts said springs under compression, so that immediately the roller is relieved of its engagement with the wear-plate it is caused to travel back to the center under the expansive action of the springs. Should it be carried beyond the center in the opposite direction it would be caught and returned by the spring controlled shoes on that side, thus moving back and forth between the two until it finally comes to rest with its trunnions between the two pairs of shoes.

The faces of the shoes J are preferably each provided with a transverse groove *j* adapted to receive the trunnion *c* of the roller. This facilitates a rolling movement of the trunnion on the supporting rails which rolling movement causes a different bearing surface to be presented to the wear-plate after each operation of the device.

In the flanges $A^3$ on the side walls of the casing are located apertures or openings $a^{10}$, through which dirt or sand that may enter the channels or chambers containing the resilient members G may drop or fall out. This prevents the accumulation of such dirt or sand in the chambers which would interfere with the efficient operation of the resilient members.

The frame D is made of hard metal and its lateral members D', D' each act as thrust members to take the lateral thrust of the antifriction member or roller C. This lateral thrust of the antifriction member or roller may occur at any time when the same is transmitting load, but comes into play particularly when the car to which the bearing is attached, is going around a curve.

In the side bearings shown in the drawings, the lateral members of the frame D define the upper limits of the guideway in which the trunnions of the roller travel and since said frame is removable from the casing in which the roller is confined, the necessity for notches or openings in the roller confining members for the introduction of the roller, as in constructions heretofore used, is obviated. The removability of said frame D is also an advantage in case it becomes damaged or worn when it may be taken from the casing and replaced by another similar frame. A construction including the removable frame D to provide the upper confining ways for the trunnions and also to provide thrust members to take the lateral thrust of the antifriction member is also of great advantage in that a casing without these devices cast integrally with the walls thereof is much more readily cast in the case of the use of malleable castings, which are the kind preferably used in making side bearings for cars.

As above described, the stops $d^4$, $d^4$, $a^6$, $a^6$, act to terminate the operation of the resilient devices upon the trunnions of the antifriction roller before said roller reaches the center of the casing. This feature of construction is of particular importance in that while the antifriction member is always returned toward the center of the casing it is not always stopped at the same point, that is to say, accurately at the center or at any other predetermined point, which prevents the resultant wear at one point of the bearing plates with which the antifriction roller engages.

We claim as our invention—

1. In an antifriction bearing, an open-sided casing, an antifriction member supported in said casing, a removable thrust member adapted to be removed through the opening in said casing and located in a position therein to take the lateral thrust of said antifriction member, means within the casing for providing vertical support for said thrust member and means for retaining said thrust member in position on said supporting means.

2. In an antifriction bearing, an open-sided casing, an antifriction member supported in said casing, a removable frame located in said casing and adapted to be removed through the opening therein, said frame having lateral members adapted to take the lateral thrust of said antifriction member, and means providing vertical support for said removable frame.

3. In an antifriction bearing, an open-sided casing, an antifriction member supported in said casing, a removable frame of hard metal located in said casing and adapted to be withdrawn through the opening therein, said frame and casing being provided with coacting shoulders adapted to give vertical support to said frame, said removable frame having lateral members adapted to take the lateral thrust of said antifriction member and means for retaining said frame in said casing.

4. In an antifriction bearing, a suspension casing provided at the lower edges of its lateral walls with longitudinally extending rails, a removable frame supported within said casing having side members located above said rails, the side walls of said casing and the side members of said frame being provided with engaging shoulders whereby said frame is supported within said casing, a wear-plate supported on said frame, the latter having upright lugs adapted to engage the lateral edges of said wear-plate, and an antifriction roller provided with trunnions adapted to be supported on said rails of the casing and projecting into said channels or chambers.

5. In an antifriction bearing, a casing, an antifriction member located therein, resilient means adapted to act upon said antifriction member and return it toward a predetermined point of said casing, and means acting to terminate the operation of said resilient means upon said antifriction member at a point spaced from said predetermined point, said antifriction member being free to move in either direction from said predetermined point through a limited space.

6. In an antifriction bearing, a suspension casing provided at the lower edges of its lateral walls with longitudinally extending rails, the side walls of said casing being provided with longitudinally extending channels or chambers located on each side of a predetermined transverse line of said casing, an antifriction roller having trunnions adapted to be supported on said rails and projecting into said channels or chambers, and resilient members located in each of said channels and adapted to engage said roller trunnions when said antifriction roller moves beyond predetermined points spaced at either side of said predetermined transverse line of the casing, said antifriction element being free to move in either direction in the space between said points.

7. In an antifriction bearing, a suspension casing provided at the lower edges of its lateral walls with longitudinally extending rails, a removable frame supported within said casing having side members located above said rails, the side walls of said casing being provided with longitudinally extending channels or chambers located on each side of a predetermined transverse line of said casing, an antifriction roller having trunnions adapted to be supported on said rails and projecting into said channels or chambers, and resilient members located in each of said channels and adapted to engage said roller trunnions when said antifriction roller moves beyond predetermined points spaced at either side of said predetermined transverse line of the casing, said antifriction element being free to move in either direction in the space between said points.

8. In an antifriction bearing, a suspension casing provided at the lower edges of its lateral walls with flanges bearing longitudinally extending rails, a removable frame supported within said casing having side members located above said rails, the side walls of said casing being provided with longitudinally extending channels or chambers located on each side of a transverse median line of said casing, an antifriction roller provided with trunnions adapted to be supported on said rails and projecting into said channels or chambers, resilient members located in each of said channels and including shoes adapted to engage said roller trunnions when said antifriction roller moves beyond predetermined points at either side of said transverse median line of the casing, and shoulders provided respectively on said frame and on the flanges on said casing adapted to limit the movement of said shoes toward said transverse median line of the casing.

9. In an antifriction bearing, a suspension casing provided at the lower edges of its lateral walls with flanges bearing longitudinally extending rails, a removable frame supported within said casing having side members located above said rails, the side walls of said casing and the side members of said frame being provided with engaging shoulders whereby said frame is supported within said casing, a wear-plate supported on said frame, the latter having upright lugs adapted to engage the lateral edges of said wear-plate, the side walls of said casing being provided with longitudinally extending channels or chambers located on each side of a transverse median line of said casing, an antifriction roller provided with trunnions adapted to be supported on said rails of the casing and projecting into said channels or chambers, resilient members located in each of said channels and including shoes adapted to engage said trunnions when said antifriction roller moves to either side of said transverse median line of the casing, and shoulders provided respectively on the side members of said movable frame and on the flanges of said casing adapted to limit the movement of said shoes toward said transverse line of the casing.

In testimony, that we claim the foregoing as our invention we affix our signatures in the presence of two witnesses, this 3rd day of March A. D. 1911.

EDWIN S. WOODS,
ARNOLD A. WEIGEL.

Witnesses:
GEORGE R. WILKINS,
T. H. ALFREDS.